US012474142B2

(12) United States Patent
Kowalczyk, Jr. et al.

(10) Patent No.: US 12,474,142 B2
(45) Date of Patent: Nov. 18, 2025

(54) FIREARM LASER SIGHT ALIGNMENT ASSEMBLY

(71) Applicant: Crosman Corporation, Bloomfield, NY (US)

(72) Inventors: John A. Kowalczyk, Jr., Fairport, NY (US); Jeffrey W. Mock, Rochester, NY (US); Jeffrey D. Tuller, Rochester, NY (US)

(73) Assignee: Crosman Corporation, Bloomfield, NY (US)

( * ) Notice: Subject to any disclaimer, the term of this patent is extended or adjusted under 35 U.S.C. 154(b) by 0 days.

(21) Appl. No.: 18/646,541

(22) Filed: Apr. 25, 2024

(65) Prior Publication Data

US 2024/0280348 A1 Aug. 22, 2024

Related U.S. Application Data

(63) Continuation of application No. 17/728,703, filed on Apr. 25, 2022, now Pat. No. 11,994,363, which is a continuation of application No. 16/601,279, filed on Oct. 14, 2019, now Pat. No. 11,320,240, which is a continuation of application No. 15/193,950, filed on Jun. 27, 2016, now Pat. No. 10,443,978, which is a continuation of application No. 14/176,932, filed on Feb. 10, 2014, now Pat. No. 9,377,271, which is a continuation of application No. 13/245,309, filed on Sep. 26, 2011, now Pat. No. 8,683,731.

(51) Int. Cl.
*F41G 1/35* (2006.01)
*F41A 19/11* (2006.01)
*F41G 1/36* (2006.01)
*G01B 11/27* (2006.01)

(52) U.S. Cl.
CPC ............... *F41G 1/35* (2013.01); *F41A 19/11* (2013.01); *F41G 1/36* (2013.01); *G01B 11/27* (2013.01); *Y10T 29/49826* (2015.01); *Y10T 29/49895* (2015.01)

(58) Field of Classification Search
CPC ... F41G 1/36; F41G 1/35; F41A 19/11; G01B 11/27; Y10T 29/49895; Y10T 29/49826
See application file for complete search history.

(56) References Cited

U.S. PATENT DOCUMENTS

| | | |
|---|---|---|
| 4,916,713 A | 4/1990 | Gerber |
| 5,056,254 A | 10/1991 | Bechtel |
| 5,179,235 A | 1/1993 | Toole |
| 5,253,443 A | 10/1993 | Baikrich |
| 5,282,594 A | 2/1994 | Huang |
| 5,375,362 A | 12/1994 | McGarry et al. |

(Continued)

OTHER PUBLICATIONS

Non Final Office Action dated Jun. 9, 2020 for U.S. Appl. No. 16/601,279, "Firearm Laser Sight Alignment Assembly", Kowalczyk Jr., 5 pages.

(Continued)

*Primary Examiner* — Benjamin P Lee
(74) *Attorney, Agent, or Firm* — Lee & Hayes, P.C.

(57) ABSTRACT

The present disclosure relates to a firearm which may include a frame with a first outer wall, and a second outer wall opposite the first outer wall. A laser module may be disposed between the first and second outer walls. An alignment pin may be in communication with the first outer wall and may be configured to move the laser module relative to the frame.

20 Claims, 14 Drawing Sheets

(56) References Cited

U.S. PATENT DOCUMENTS

| | | |
|---|---|---|
| 5,485,695 A | 1/1996 | Glock |
| 5,531,040 A | 7/1996 | Moore |
| 5,581,898 A | 12/1996 | Thummel |
| 5,590,486 A | 1/1997 | Moore |
| 5,621,999 A | 4/1997 | Moore |
| 5,706,600 A | 1/1998 | Toole et al. |
| 5,727,346 A | 3/1998 | Lazzarini et al. |
| 5,758,448 A | 6/1998 | Thummel |
| 5,784,823 A | 7/1998 | Chen |
| 6,230,431 B1 | 5/2001 | Bear |
| 6,393,752 B1 | 5/2002 | Oliver et al. |
| 7,117,627 B2 | 10/2006 | Woodmansee, III et al. |
| 7,275,344 B2 | 10/2007 | Woodmansee, III et al. |
| 7,331,137 B2 | 2/2008 | Hsu |
| 7,395,627 B2 | 7/2008 | La France et al. |
| 7,472,830 B2 | 1/2009 | Danielson |
| D603,478 S | 11/2009 | Hughes |
| 7,726,061 B1 | 6/2010 | Thummel |
| D636,049 S | 4/2011 | Hughes |
| D636,837 S | 4/2011 | Hughes |
| 7,926,218 B2 | 4/2011 | Matthews |
| 8,109,024 B2 | 2/2012 | Abst |
| 8,117,782 B2 | 2/2012 | Gross et al. |
| 8,256,154 B2 | 9/2012 | Danielson et al. |
| 8,371,729 B2 | 2/2013 | Sharrah et al. |
| 8,683,731 B2 | 4/2014 | Kowalczyk, Jr. |
| 8,713,844 B2 | 5/2014 | Tuller, Jr. |
| 9,377,271 B2 | 6/2016 | Kowalczyk, Jr. |
| 9,879,945 B2 | 1/2018 | Tuller, Jr. |
| 10,443,978 B2 | 10/2019 | Kowalczyk, Jr. |
| 10,718,593 B2 | 7/2020 | Tuller |
| 11,320,240 B2 | 5/2022 | Kowalczyk, Jr. |
| 11,965,710 B2 | 4/2024 | Tuller |
| 2001/0016261 A1 | 8/2001 | Kondo |
| 2002/0100202 A1 | 8/2002 | Lin et al. |
| 2004/0128900 A1 | 7/2004 | Chen et al. |
| 2005/0257415 A1 | 11/2005 | Solinsky et al. |
| 2007/0064354 A1 | 3/2007 | West |
| 2007/0113462 A1 | 5/2007 | Ho |
| 2007/0193103 A1 | 8/2007 | Cheng |
| 2009/0307955 A1 | 12/2009 | NuDyke |
| 2010/0064568 A1 | 3/2010 | NuDyke |
| 2010/0154279 A1 | 6/2010 | Polyzos et al. |
| 2010/0162610 A1 | 7/2010 | Moore et al. |
| 2011/0015427 A1 | 1/2011 | Hummelen et al. |
| 2011/0035984 A1 | 2/2011 | Liu |
| 2011/0047851 A1 | 3/2011 | Mock et al. |
| 2011/0061283 A1 | 3/2011 | Cavallo et al. |
| 2011/0062383 A1 | 3/2011 | Kibe et al. |
| 2011/0107648 A1 | 5/2011 | Tuz |
| 2011/0167707 A1 | 7/2011 | Gross et al. |
| 2011/0232151 A1 | 9/2011 | Zukowski |
| 2012/0047787 A1 | 3/2012 | Curry |
| 2012/0085015 A1 | 4/2012 | Wei |
| 2012/0144718 A1 | 6/2012 | Danielson et al. |
| 2012/0198748 A1 | 8/2012 | Ospino Orozco |
| 2013/0074351 A1 | 3/2013 | Kowalczyk et al. |
| 2014/0150323 A1 | 6/2014 | Kowalczyk, Jr. et al. |
| 2014/0283431 A1 | 9/2014 | Tuller, Jr. |
| 2016/0209168 A1 | 7/2016 | Sharrah et al. |
| 2016/0305742 A1 | 10/2016 | Kowalczyk, Jr. et al. |
| 2020/0109917 A1 | 4/2020 | Kowalczyk, Jr. et al. |
| 2021/0003368 A1 | 1/2021 | Tuller et al. |
| 2022/0325982 A1 | 10/2022 | Kowalczyk |
| 2024/0280348 A1 | 8/2024 | Kowalczyk |
| 2024/0302132 A1 | 9/2024 | Tuller |

OTHER PUBLICATIONS

Office Action for U.S. Appl. No. 15/882,444, mailed on Jan. 22, 19, Jeffrey D. Tuller et al., "Firearm Laser Sight Alignment Assembly", 5 pages.

Office action for U.S. Appl. No. 14/269,892, mailed on Nov. 16, 2016, Tuller et al., "Firearm Laser Sight Alignment Assembly", 15 pages.

Office Action for U.S. Appl. No. 14/176,932, mailed on Feb. 3, 2015, John Kowalczyk, Jr. et al., "Firearm Laser Sight Alignment Assembly", 2 pages.

Office Action for U.S. Appl. No. 15/882,444, mailed on Mar. 22, 2018, Tuller et al., "Firearm Laser Sight Alignment Assembly", 17 pages.

Office Action for U.S. Appl. No. 13/245,309, mailed on Mar. 25, 2013, John Kowalczyk, Jr. et al., "Firearm Laser Sight Alignment Assembly", 11 pages.

Office Action for U.S. Appl. No. 13/759,768, mailed on Mar. 28, 2013, Jeffrey D. Tuller et al., "Firearm Laser Sight Alignment Assembly", 15 pages.

Office action for U.S. Appl. No. 15/193,950 mailed on May 24, 2018, Kowalczyk, Jr. et al., "Firearm Laser Sight Alignment Assembly", 6 pages.

Office Action for U.S. Appl. No. 16/601,279, mailed on Jun. 23, 2021, Kowalczyk, "Firearm Laser Sight Alignment Assembly", 15 pages.

Office action for U.S. Appl. No. 14/176,932 mailed on Jul. 10, 2015, Kowalczyk, Jr. et al., "Firearm Laser Sight Alignment Assembly", 9 pages.

Office Action for U.S. Appl. No. 14/176,932, mailed on Jul. 31, 2014, John A. Kowalczyk Jr., "Firearm Laser Sight Alignment Assembly", 9 pages.

Office action for U.S. Appl. No. 15/193,950 mailed on Aug. 1, 2017, Kowalczyk, Jr. et al., "Firearm Laser Sight Alignment Assembly", 14 pages.

Office Action for U.S. Appl. No. 13/759,768, mailed on Aug. 12, 2013, Jeffrey D. Tuller et al., "Firearm Laser Sight Alignment Assembly", 14 pages.

Office Action for U.S. Appl. No. 17/728,703, mailed on Feb. 7, 2023, John A. Kowalczyk, "Firearm Laser Sight Alignment Assembly", 5 pages.

Office Action for U.S. Appl. No. 18/642,671, mailed on Nov. 4, 2024, Tuller, "Firearm Laser Sight Alignment Assembly", 17 pages.

Office Action for U.S. Appl. No. 18/626,541, mailed on Nov. 13, 2024, Kowalczyk Jr., "Firearm Laser Sight Alignment Assembly", 5 pages.

Office Action for U.S. Appl. No. 16/932,061, mailed on Jul. 18, 2023, Tuller, "Firearm Laser Sight Alignment Assembly", 12 pages.

Office Action for U.S. Appl. No. 16/932,061, mailed on Jul. 19, 2022, Tuller, "Firearm Laser Sight Alignment Assembly", 12 pages.

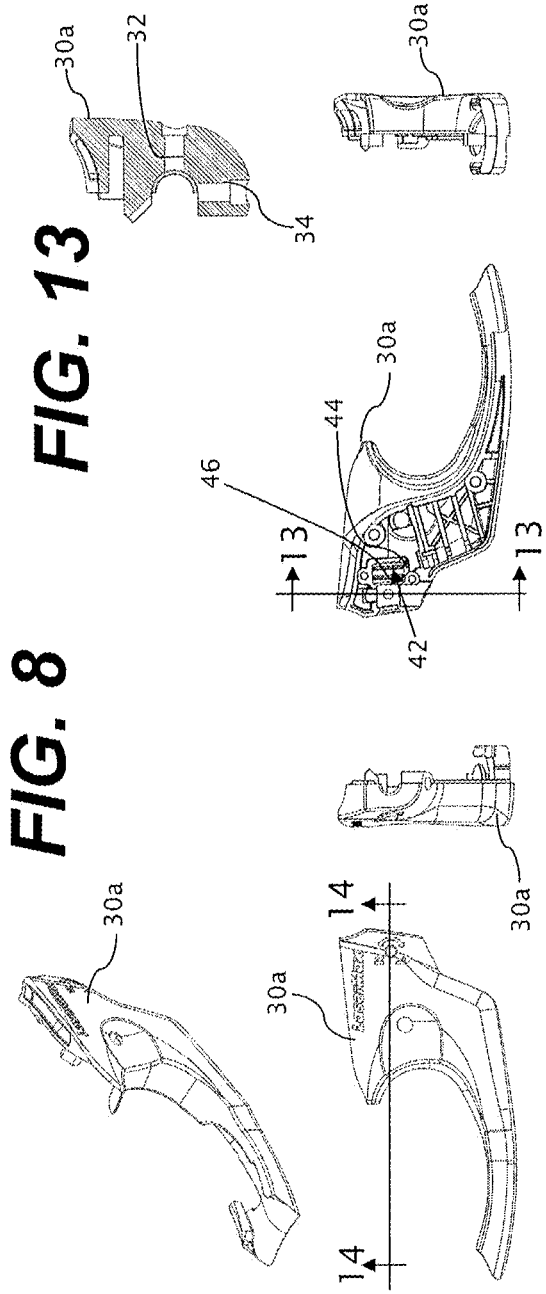
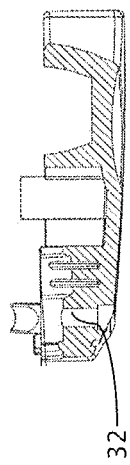

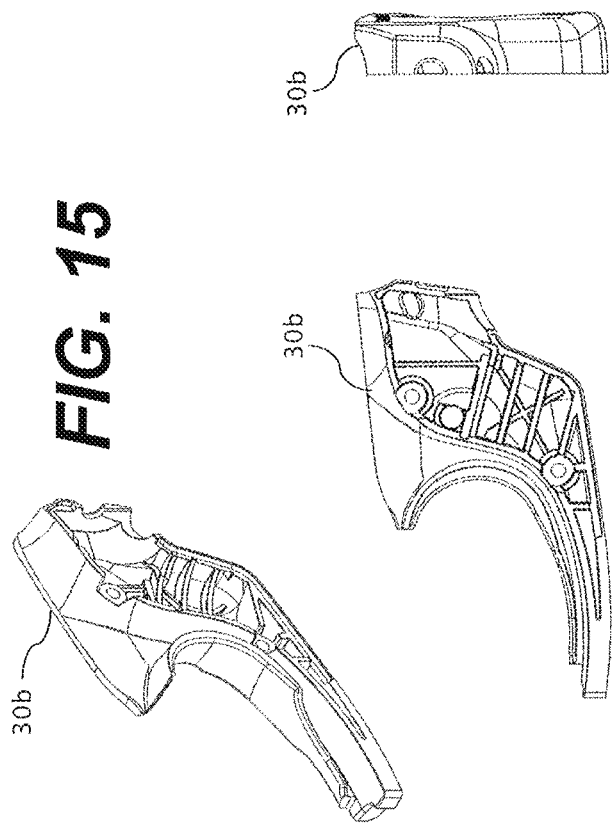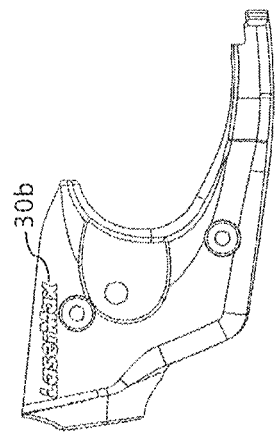

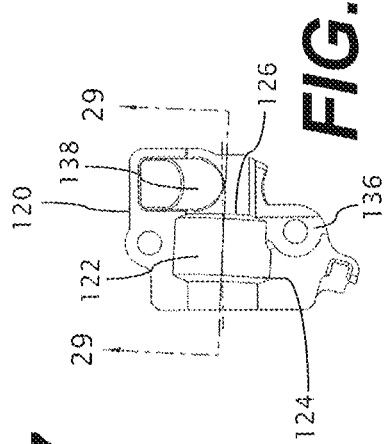
FIG. 25   FIG. 26   FIG. 27
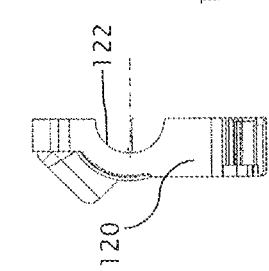
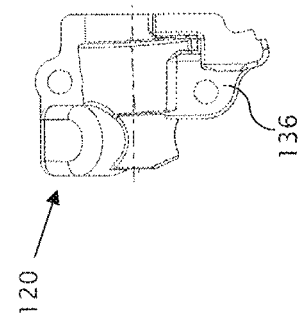
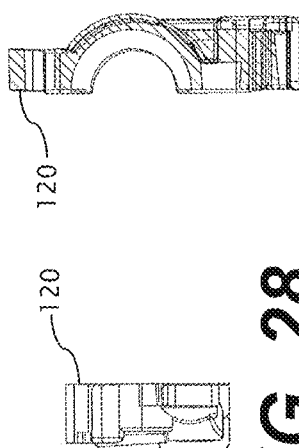
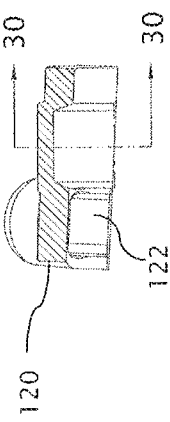
FIG. 28   FIG. 29   FIG. 30

FIREARM LASER SIGHT ALIGNMENT ASSEMBLY

CROSS-REFERENCE TO RELATED APPLICATIONS

This Application is a continuation of and claims priority to U.S. patent application Ser. No. 17/728,703, filed Apr. 25, 2022, which is a continuation of U.S. patent application Ser. No. 16/601,279, filed Oct. 14, 2019, now U.S. Pat. No. 11,320,240, which is a continuation of U.S. patent application Ser. No. 15/193,950, filed Jun. 27, 2016, now U.S. Pat. No. 10,443,978, which is a continuation of U.S. patent application Ser. No. 14/176,932, filed Feb. 10, 2014, now U.S. Pat. No. 9,377,271, which is a continuation of U.S. patent application Ser. No. 13/245,309, filed Sep. 26, 2011, now U.S. Pat. No. 8,683,731, which disclosures are incorporated herein by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION FIELD OF THE INVENTION

The present disclosure generally relates to sights for firearms and particularly to laser sights for firearms, and more particularly to a firearm laser sight alignment assembly.

DESCRIPTION OF RELATED ART

Laser sighting devices for firearms have been used for a number of years. Laser sighting devices use a laser to assist in sighting the firearm. However, as the laser beam will follow an effectively straight line, and the bullet will follow a ballistic trajectory so that, despite a high muzzle velocity, at long distances the trajectory of the bullet will deviate significantly from the straight line. Also, the laser sight must be mounted to the firearm, which means that the laser beam cannot propagate concentric with the barrel. Consequently, it is necessary to aim the laser sight so that, for a given distance, the beam will illuminate the target with a spot at the position where the bullet will be after traveling that distance. The vertical setting of the laser beam is known as "elevation" and the lateral adjustment of the beam is known as "windage."

Prior patents have been directed to the adjustment of a laser sight. U.S. Pat. No. 5,784,823 to Chen discloses a laser centrally mounted in a semi-spherical fixture which is disposed in a casing. The laser is positioned in the casing by rotation of the fixture therein, and held at the desired angle by frictional force. U.S. Pat. No. 5,581,898 to Thummel discloses a laser module disposed within a housing adapted to be mounted on a firearm, wherein the back of the laser module is seated in the back of the housing and orthogonal set screws are positioned to move the front of the module to set the elevation and windage. U.S. Pat. No. 5,253,443 to Baikrich discloses a laser sighting device having a laser module disposed in a housing and seated against the back of the housing, wherein the front of the module is moved laterally by longitudinally moving cam members having threads which engage axially rotatable rings disposed around the housing.

However, these prior devices require a significant number of components. The large number of components adds complexity in manufacturing and inventory. In addition, the large number of parts, each having an associated tolerance, creates alignment issues with respect to both manufacture and use of the product. Further, prior devices which position lasers external to the frame of the firearm may suffer from misalignment issues in circumstances where the external laser and/or its associated mounting assembly endures rugged use (i.e., is bumped into, dropped, etc.).

Therefore, the need exists for an alignment system for a firearm laser sight, wherein the number of components is reduced, thereby providing more efficient manufacture. The need further exists for an alignment system that can accommodate manufacturing tolerances of the components to provide a ready and reproducible alignment.

BRIEF SUMMARY OF THE INVENTION

The present disclosure relates to a firearm which may include a frame with a first outer wall, and a second outer wall opposite the first outer wall. A laser module may be disposed between the first and second outer walls. An alignment pin may be in communication with the first outer wall and may be configured to move the laser module relative to the frame.

In further embodiments, the present disclosure relates to a firearm which may include a barrel having a firing axis parallel to the length of the barrel and a frame forming a substantially hollow-muzzle portion beneath the barrel. A laser module may be dis posed within the muzzle portion and may be movable relative to the frame. In some embodiments, the laser module may be configured to selectively emit a beam of radiation exiting the muzzle portion along a beam path. An alignment pin may be movably connected to the frame and may contact the laser module. In some embodiments, movement of the alignment pin may result in movement of the laser module relative to the frame.

In still further embodiments, the present disclosure relates to a method of moving a laser module disposed within a frame of a firearm. The method may include moving an alignment pin that is movably connected to an outer wall of the frame and in contact with the laser module. In such an embodiment, movement of the alignment pin results in movement of the laser module relative to the frame.

BRIEF DESCRIPTION OF THE SEVERAL VIEWS OF THE DRAWING(S)

FIG. 8 is a perspective view of a right half of the housing.

FIG. 9 is a right side elevation view of the right housing half of FIG. 8.

FIG. 10 is a left side elevation view of the right housing half of FIG. 8.

FIG. 11 is a front elevation view of the right housing half of FIG. 8.

FIG. 12 is a rear elevation view of the right housing half of FIG. 8.

FIG. 13 is a cross sectional view taken along lines 13-13 of the right housing half of FIG. 10.

FIG. 14 is a cross sectional view taken along lines 14-14 of the right housing half of FIG. 9.

FIG. 15 is a perspective view of a left half of the housing.

FIG. 16 is a right side elevation view of the left housing half of FIG. 15.

FIG. 17 is a left side elevation view of the left housing half of FIG. 15.

FIG. 18 is a front elevation view of the left housing half of FIG. 15.

FIG. 25 is a left side elevation view of the laser cover.

FIG. 26 is a right side elevation view of the laser cover of FIG. 25.

FIG. 27 is a rear elevation view of the laser cover of FIG. 25.

FIG. 28 is a bottom plan view of the laser cover of FIG. 25.

FIG. 29 is a cross section view taken along line 29-29 of FIG. 26.

FIG. 30 is a cross section view taken along line 30-30 of FIG. 29.

DETAILED DESCRIPTION OF THE INVENTION

Figure 1:
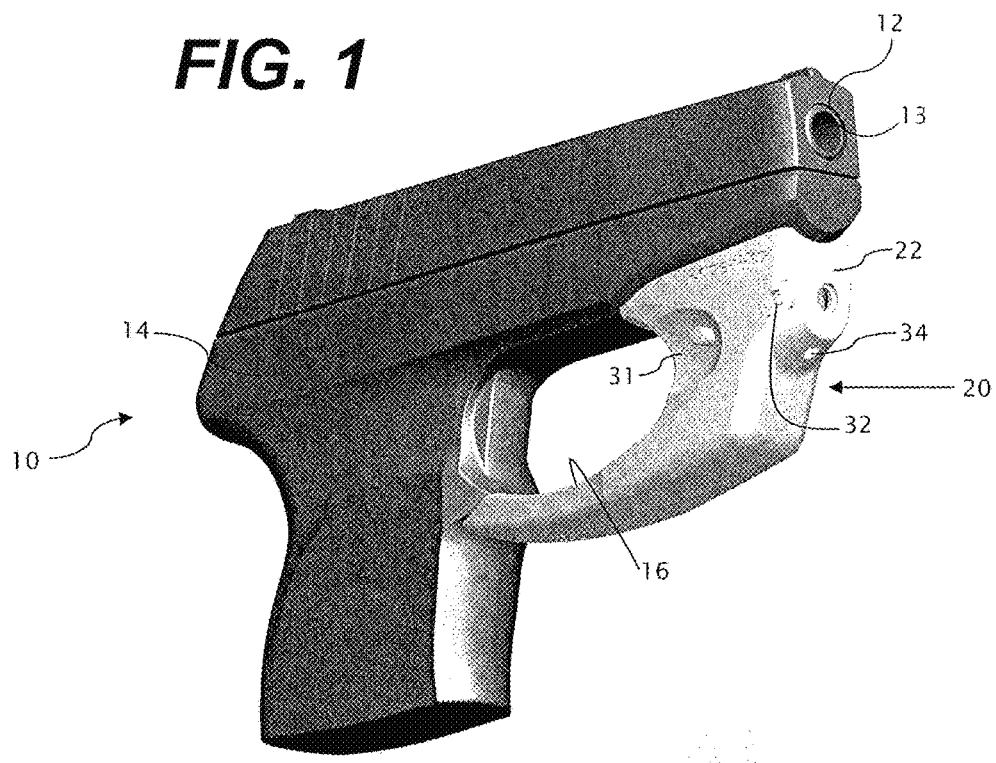
FIG. 1 is a perspective view of a laser sight having an alignment assembly, wherein the laser sight is connected to a firearm.

Referring to FIG. 1, the present firearm laser sight alignment assembly 20 is embodied in a laser sight 22 shown operably engaged with a firearm 10.

Although the firearm 10 is shown as a hand gun, it is understood the alignment assembly 20 is not limited to use with handguns, but can be employed with any pistol, gun, revolver, or rifle that selectively launches a projectile, whether by compressed gas, combustion or electromagnetic actuation. Further, although the assembly 20 is shown in conjunction with a firearm that does not have any mounting rail, it is understood the assembly can be employed with laser sight 22 that engages a mounting rail. The assembly 20 is not limited by the particular laser sight or mechanism for engaging the firearm 10.

The firearm 10 includes in relevant part a barrel 12, a frame 14, and a trigger guard 16. Although the alignment assembly 20 is shown as engaging the trigger guard 16 of the firearm 10, it is understood the alignment assembly 20 can be cooperatively engaged with any portion of the firearm 10.

For purposes of description, the term "longitudinal" means the dimensions along the direction of the barrel 12. The term "width" means the dimension along a direction transverse to the axis of the barrel 12. The term "axial" means in a direction transverse to the axis of the barrel 12. The term "forward" means nearer to or towards a muzzle 13. The term "rearward" means further from or away from the muzzle 13. The term "below" means lower than, in the intended operating orientation of the firearm 10. The term "above" means higher than, in the intended operating orientation of the firearm 10. The term "preclude movement" means to prevent movement which would otherwise prevent functioning in an intended manner. The term "angular" means rotating about at least one of the longitudinal and axial directions.

The alignment assembly 20 includes a housing 30, a laser module 60, a resilient coupling 90 and a laser cover 120.

The housing 30 retains the laser module 60, the coupling 90 and the laser cover 120. In one configuration, the housing 30 is formed of mating halves (30a, 30b). However, it is understood the housing 30 can be formed as a single integral component or from a multitude of interconnected components. It has been found satisfactory to injection mold the housing 30 out of an elastomer such as a glass-filled nylon and particularly a nylon 6.6 compound reinforced with 33% glass fiber; suitable for processing by injection molding, wherein the material is lubricated for ease of mold release.

Figure 7:
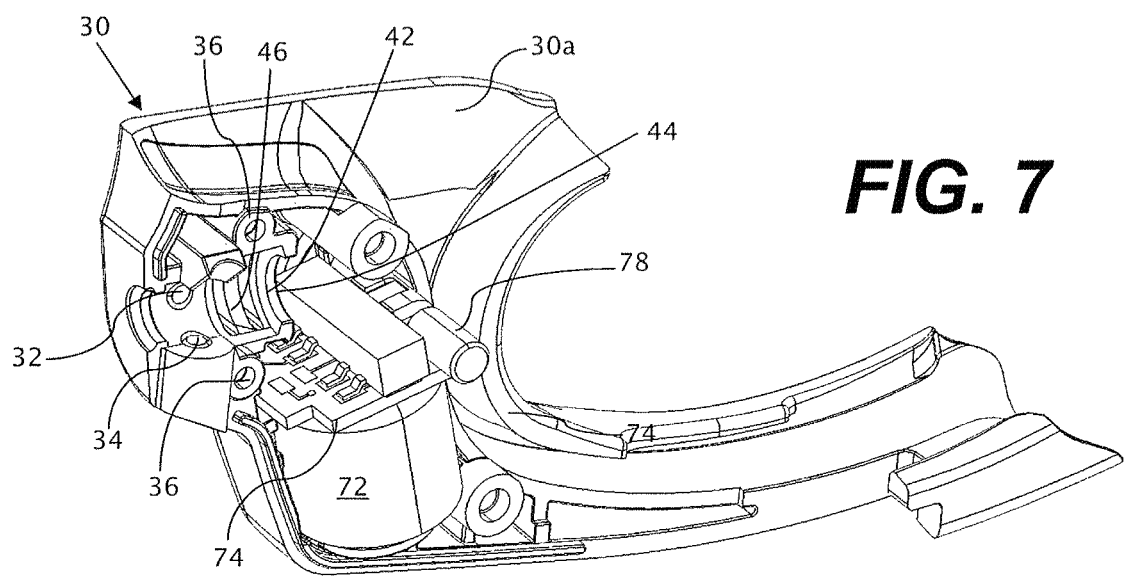
FIG. 7 is a perspective view of the alignment assembly of FIG. 2, having the laser cover, the coupling and the laser module removed
Figure 19:
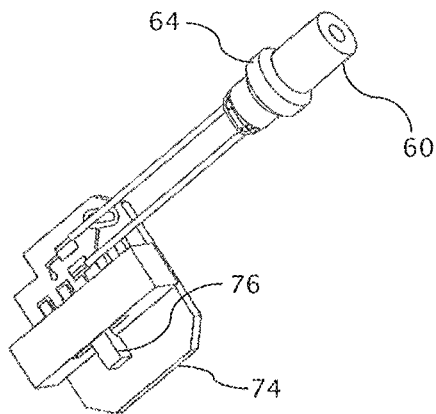
FIG. 19 is a perspective view of the laser module with connected circuit board.
Figure 20:
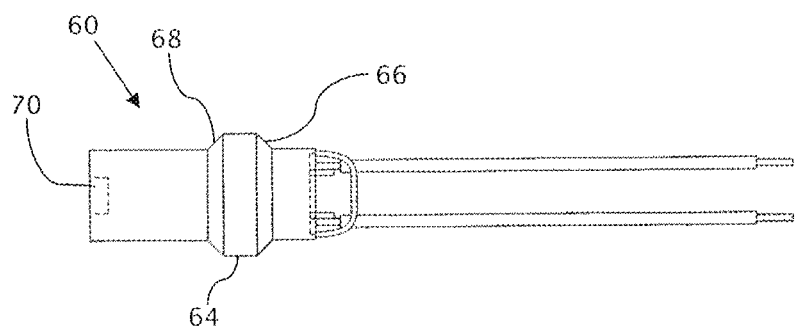
FIG. 20 is a plan view of the laser module.
Figure 21:
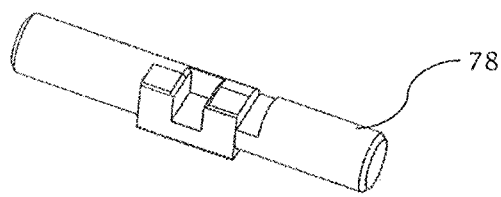
FIG. 21 is a perspective view of a portion of the switch.

The housing 30 includes at least one and in some configurations, two alignment pins 32, 34. The alignment pins 32, 34 are moveable relative to the housing 30 to contact the laser module 60. As seen in FIGS. 1, 3, and 7, the alignment pins 32, 34 can be perpendicular to each other, wherein one pin provides for movement of the laser module 60 for elevation control and movement of the remaining pin provides for windage control.

In one configuration, the alignment pins 32, 34 are threadingly engaged with the housing in corresponding through holes 33, 35. The through holes 33, 35 are sized so that the alignment pins cut at least a portion of corresponding threads in the housing 30. Thus, upon initial engagement of the alignment pins 32, 34 with the corresponding through holes 33, 35 the alignment pins cut the threads in the housing 30. It is understood a portion of each through hole 33, 35 may be formed with threads and a remaining of the through holes is formed without threads, such that the threads are formed in the remaining portion by initial engagement of the alignment pins 32, 34.

As seen in FIGS. 7 and 10, the housing 30 includes a socket 42 sized to cooperatively engage a portion of the coupling 90 in an interference fit. In one configuration, the socket 42 is formed in one of the halves of the housing 30. However, it is understood the socket 42 can be formed by any of a variety of constructions which provide the interference fit with the coupling 90. The socket 42 includes at least one, and can have two generally planar mating surfaces 44, 46 that incline with respect to corresponding surfaces of the coupling 90. In one configuration, the socket 42 of the housing 30 has the first mating surface 44 inclined toward the muzzle 13 and the second mating surface 46 inclined away from the muzzle.

The laser module 60 includes a laser for selectively emitting a beam of radiation, such as coherent radiation, along an optical axis. In one configuration, the laser module 60 includes an outer seat 64 in the form of an annular ridge. The outer seat 64 includes a pair of contact faces 66, 68, wherein the faces are non-parallel. As set forth in connection with the description of the coupling 90, it is understood the outer seat 64 can be arranged as a groove or recess, at least partially defined by the pair of contact faces 66, 68. As with the socket 42 in the housing 30, the contact faces 66, 68 of the outer seat 64 of the laser module 60 can be oppositely inclined with respect to the longitudinal dimension.

Depending on the construction of the laser module 60 and the housing 30, at least one of the laser module 60 and the housing 30 can include a lens or window 70 through which the laser module can project, wherein the lens can function to provide a contained environment for the laser module as well as provide optical manipulation of the passing beam, such as focusing or polarization.

It is understood that the laser module 60 is a commercially available assembly and is operably connected to a power supply 72 and a control board 74 shown in FIGS. 4-7 and 19. A satisfactory laser 60 module includes a red laser at 650 nm with an output power of 3.5 to 4.8 mW when powered by 3 volt lithium battery. It is understood the laser in the laser module 60 can be any of a variety of lasers such as, but not limited to infrared lasers, lasers emitting at 532 nm; 635 nm or 850 nm. In an exemplary embodiment, the laser module 60 may comprise, for example, one or more of a green laser, a red laser, an infrared laser, an infrared light emitting diode ("LED"), a white and colored LED, a laser having an output of approximately 5 mW (it is understood that lasers having an output greater than approximately 5 mW or less than approximately 5 mW may also be used), and a short wavelength infrared laser ("SWIR"). It is understood that a SWIR may emit a signal, beam, pulse, and/or other radiation having a wavelength of between, approximately 0.9 μm and approximately 2.5 μm.

The power supply 72 can be any of a variety of commercially available batteries, either rechargeable or disposable. In exemplary embodiments of the present disclosure, the power supply 72 may be housed and/or otherwise disposed anywhere within the frame 14 and/or within the housing 30 of the alignment assembly 20. Such a configuration is illustrated in, for example, FIGS. 4, 5, and 7. Alternatively, in the additional exemplary embodiments included herein, such as the embodiment of FIGS. 31-34, the power supply 72 may be disposed beneath or rearward of the laser module 60. In such embodiments, the power supply 72 may be substantially and/or completely disposed within the frame 14. For example, in the embodiments of FIGS. 31-34, the power supply 72 may be disposed beneath, forward, or rearward of the control board 74.

In one configuration, the control board 74 is also commercially available and sold in conjunction with the laser module 60. The control board 74 is connected to the power supply 72 and includes a switch 76 for selectively operating or supplying the laser module 60 with power. The switch 76 can include or be connected to an arm 78 that is accessible outside of the housing 3. Thus, for the housing 30 engaging a portion of the trigger guard 16 of the firearm 10, the switch 76 is located longitudinally intermediate the muzzle 13 and the trigger guard and below the barrel 12 of the firearm 10. Further, the switch 76 is disposed outside of the periphery of the trigger guard 16 and forward of the trigger guard.

In addition, the switch 76 can be configured such that the switch is moveable from a center, off, position to a left or a right on position. Therefore, in the center off position a portion of the switch 76 is accessible to each of the left and right sides of the housing 30—by virtue of the construction of the housing, such as by associated depressions or recesses 31 as seen FIGS. 1-3 and the sizing of the arm 78. The switch 76 can therefore be actuated by the user through contact from either side of the housing 30, thus providing non-handed actuation. That is, an outside surface of the housing 30 can include recesses, depressions or dimples 31 adjacent to the switch 76 so that the switch is moveable relative to the housing while at least initially being with the width of the housing.

Further, the arm 78 can be sized so that the dimension of the switch transverse to the barrel 12 is no greater than the width of the firearm 10 or frame 14. Thus, if the firearm 10 is holstered such that the sides of the firearm contact a holster, the arm 78 being dimensioned to be within the width of the firearm 10 or frame 14 does not contact the holster and thus minimizes unintended operation of the sight 22. For example, for use with the Ruger LCP having a frame width of approximately 0.82 inches, the arm 78 would have a dimension along the transverse direction of approximately 0.74 inches, or less. Therefore, in the off (centered) position of the arm 78, the arm lies within the width of the frame 14 or the firearm 10.

Figure 23:
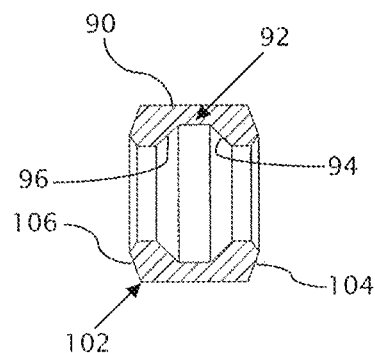
FIG. 23 is a cross section view taken along line 23-23 of the coupling of FIG. 22.

The coupling 90 cooperative engages the laser module 60 to form a laser module/coupling subassembly. As seen in FIG. 23, the coupling 90 includes an internal seat 92 for engaging the laser module 60 and an external seat 102 for engaging the housing 30 and the laser cover 120.

The internal seat 92 can include facets 94, 96 for contacting the contact faces 66, 68 of the outer seat 64 of the laser module 60 such that an interference fit is formed between the coupling 90 and the laser module.

The term interference fit means a fit between mating assembled surfaces (parts) that provides an interference and a deviation from nominal dimensions in at least one of the mating surfaces. The interference fit is sufficient to preclude relative longitudinal or axial movement between the coupling 90 and the laser module 60 (or the coupling and the housing 30 or laser cover 120). In one configuration, the interference fit incorporates the contact of two non-parallel generally planar surface s, such as along a line of contact.

Figure 22:
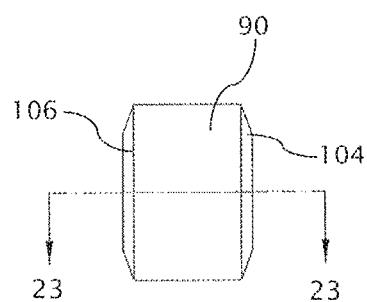
FIG. 22 is a side elevation view of the coupling.
Figure 24:
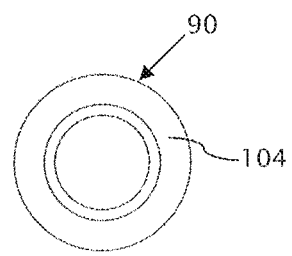
FIG. 24 is a front elevation view of the coupling of FIG. 22.

Referring to FIGS. 22-24, the external seat 102 of the coupling 90 includes at least one facet 104 for forming an interference fit with at least one of the housing 30 and the laser cover 120. In one configuration, the external seat 102 includes a pair of facets 104, 106 for engaging the housing 30 and laser cover 120.

In one configuration, the engagement of the coupling 90 and the laser module 60 is free of adhesive. That is, the interface between the components is without an outside substance that causes the parts to be held closely or firmly.

The coupling 90 can be referred to as a grommet, ring or collar extending about the laser module 60. In certain of these configurations, the coupling 90 has a substantially uniform cross section. However, it is contemplated the coupling 90 can include a nonuniform cross section, wherein selected portions of the coupling are sized to contact the laser module 60, the laser cover 120 and the housing 30.

For example, the coupling 90 can be formed to define inwardly projecting tabs or teeth, wherein the outer seat 64 of the laser module 60 includes corresponding recesses to capture the tabs, thereby retaining the coupling relative to the laser module in the desired degree of retention.

A satisfactory material of the coupling 90 provides for a resilient but deformable shape. An available material for the coupling 90 is Santoprene®, a thermoplastic vulcanizate (TPV) sold by Exxon Mobile. The TPV is believed to be a mixture of in-situ cross linking of EPDM rubber and polypropylene. Santoprene® 101-64 with a 69 durometer has been found satisfactory for the coupling 90.

The laser cover 120 contacts the coupling 90 as the coupling is engaged with the laser module 60 to retain the laser module relative to the housing 30. Although the laser cover 120 is shown as a separate component than the housing halves 30, it is understood the structure and function of the laser cover can be accomplished by a structured housing half or other component for engaging the housing.

As seen in FIGS. 26, 27, and 29, the laser cover 120 includes a socket 122 sized to cooperatively engage a portion of the coupling 90 in an interference fit. In one configuration, the socket 122 is formed in laser cover 120 to engage the external seat 102 of the coupling 90 in an interference fit. The socket 122 includes at least one, and in selected configurations two inclined surfaces 124, 126 for contacting the facets 104, 106 of the coupling 90 in the interference fit, as shown in FIGS. 3B and 3C.

The laser cover 120 further includes a capture recess 138 for retaining a bias member 140, such as a coil spring, to contact the laser module 60.

In one configuration, the engagement of the coupling 90 and the laser cover 120 is free of adhesive.

The laser cover 120 and the housing 30 include corresponding apertures and the housing includes threaded (or threadable) recesses for cooperatively engaging the laser cover and the housing. Although threaded connection is shown in the Figures, it is understood any available mechanical fastening could be employed, such as snap fit, press fit or friction fit.

Further, in one configuration the connection of the laser cover 120 to the housing 30 is defined by contacting stop surfaces on the housing and the laser cover 36, 136, respectively. That is, the laser cover 120 and the housing 30 are engaged, such as threaded together, to retain the laser module/coupling subassembly until the stop surfaces contact 36, 136. Thus, any deviation from nominal in the laser module/coupling subassembly does not vary the engagement of the laser cover 120 and the housing 30.

The sockets 42, 122 of the housing 30 and the laser cover 120 are configured, such that upon engagement of the laser cover and the housing to retain the laser module/coupling subassembly, the laser module 60 is disposed in a predetermined nonaligned orientation. That is, the laser module 60 is initially aligned in a predetermined orientation that is not an intended operating orientation. For example, if the laser module were operated upon initial engagement between the housing 30 and the laser cover 120, the projected beam would always be in the same quadrant relative to the longitudinal axis.

Figure 2:
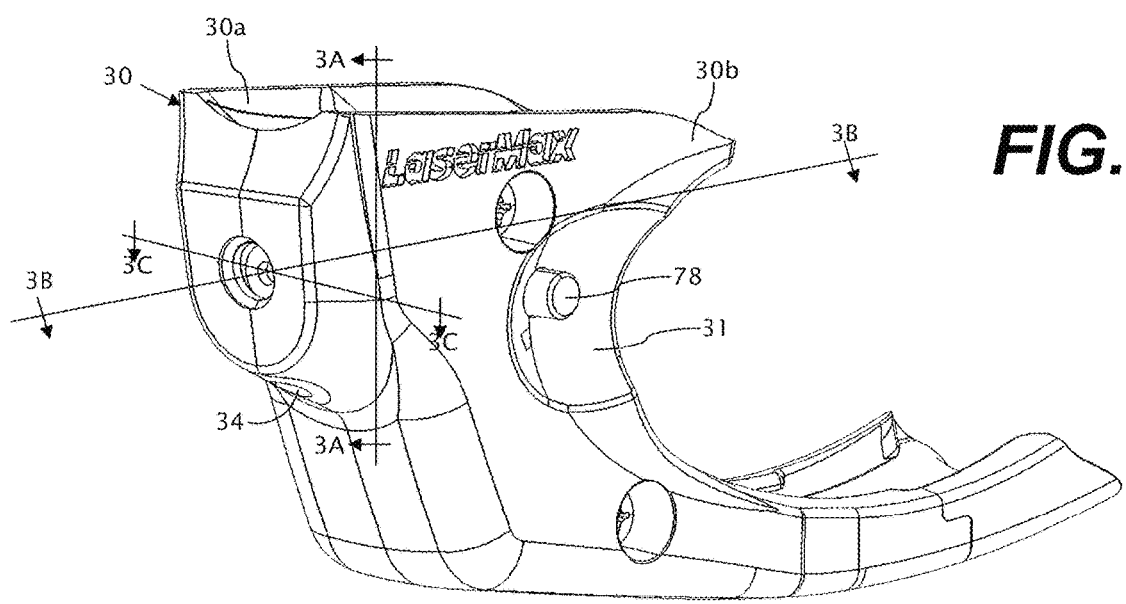
FIG. 2 is a perspective view of the laser sight having the alignment assembly.
Figure 3A:
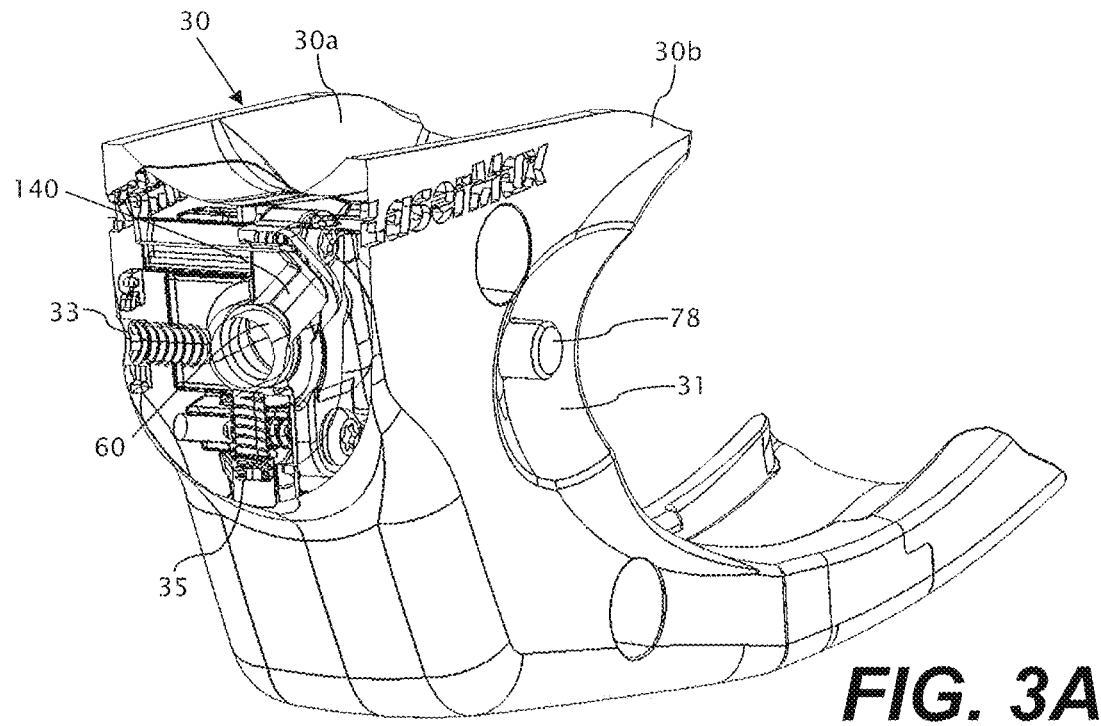
FIG. 3A is a perspective view of the alignment assembly of FIG. 2, taken along line 3A-3A.
Figure 3B:
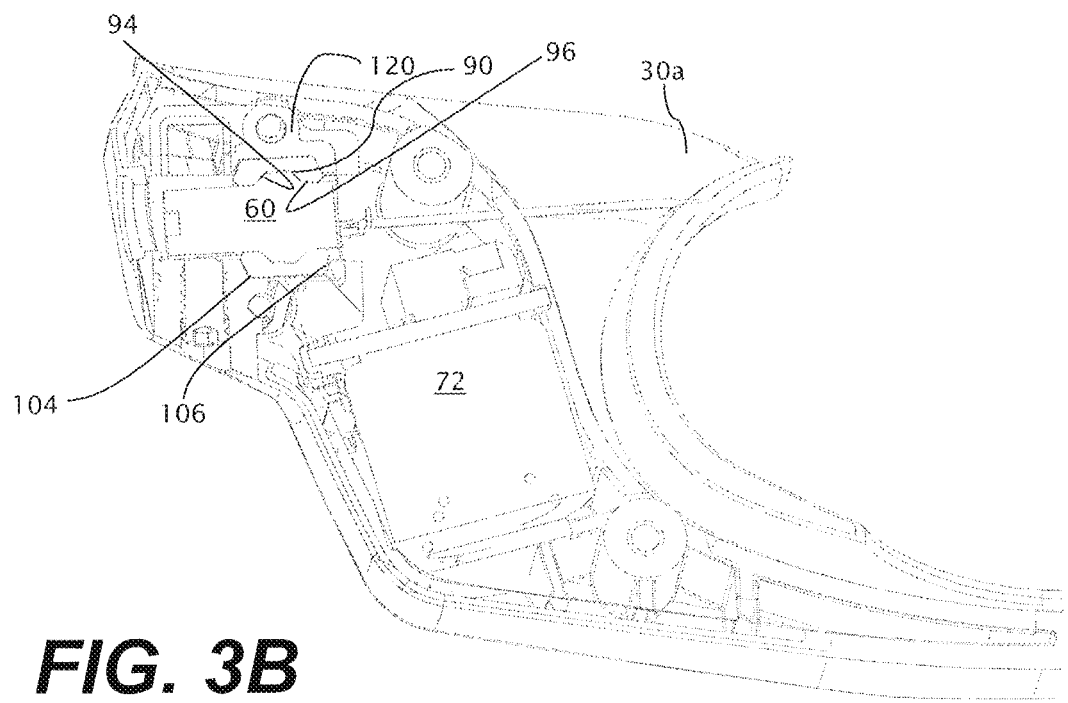
FIG. 3B is a perspective view of the alignment assembly of FIG. 2, taken along line 3B-3B.
Figure 3C:
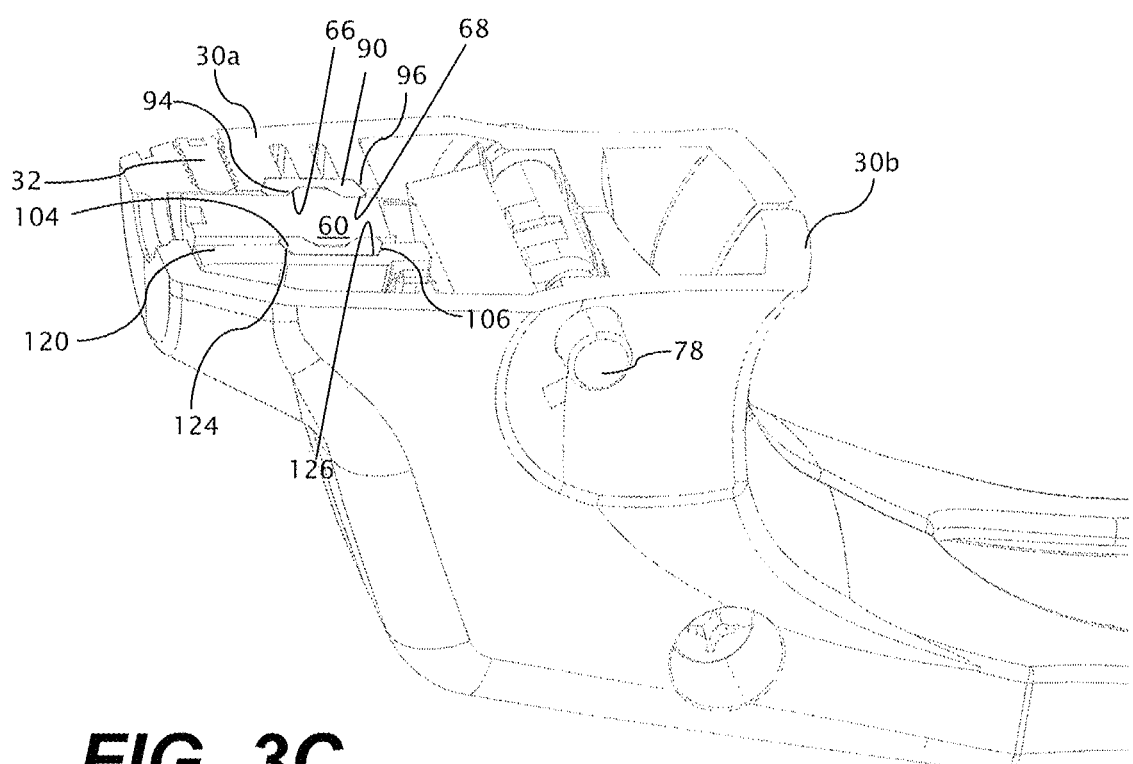
FIG. 3C is a perspective view of the alignment assembly of FIG. 2, taken along line 3C-3C.
Figure 4:
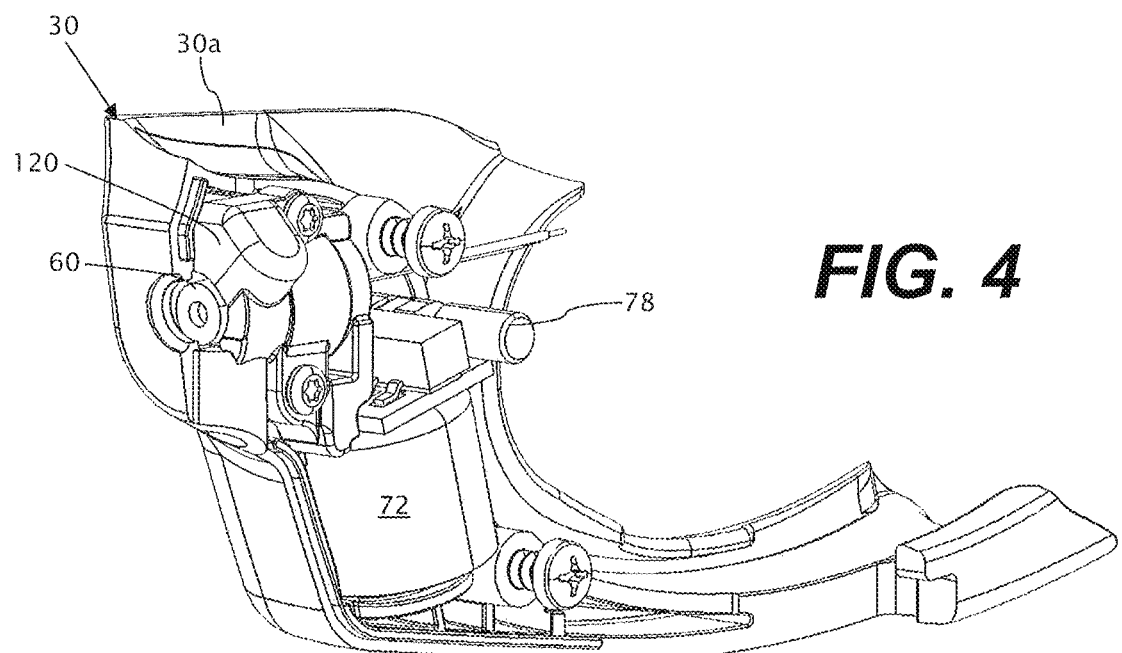
FIG. 4 is a perspective view of the alignment assembly with a portion of the housing removed.
Figure 5:
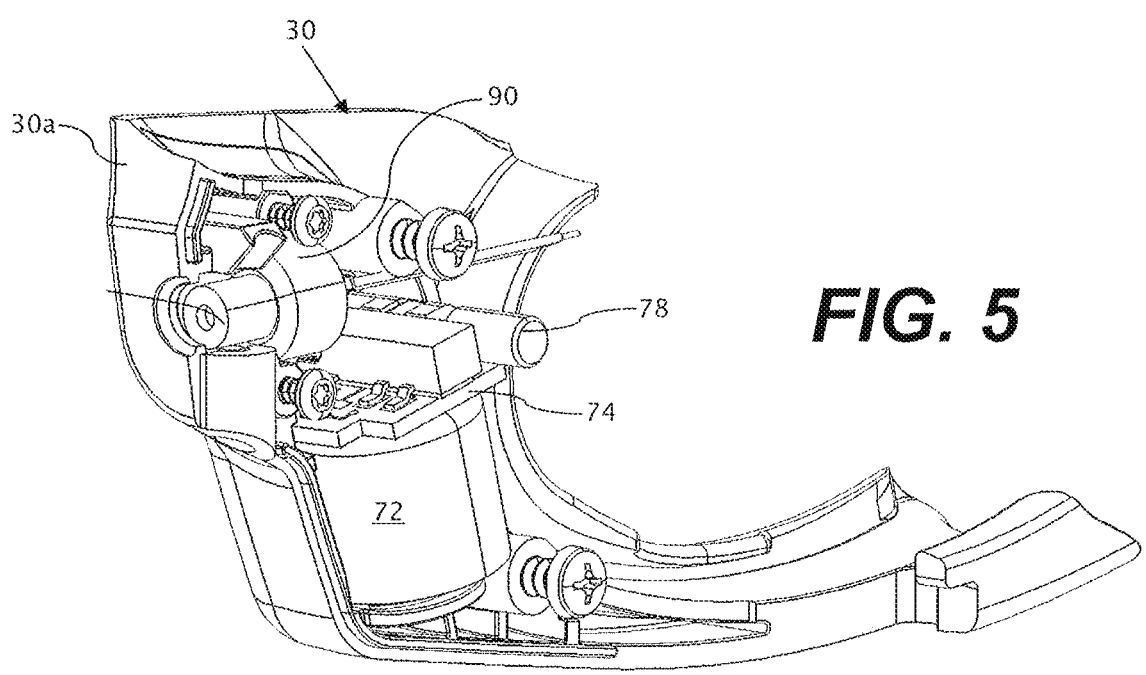
FIG. 5 is a perspective view of the alignment assembly of FIG. 2, having the laser cover removed.
Figure 6:
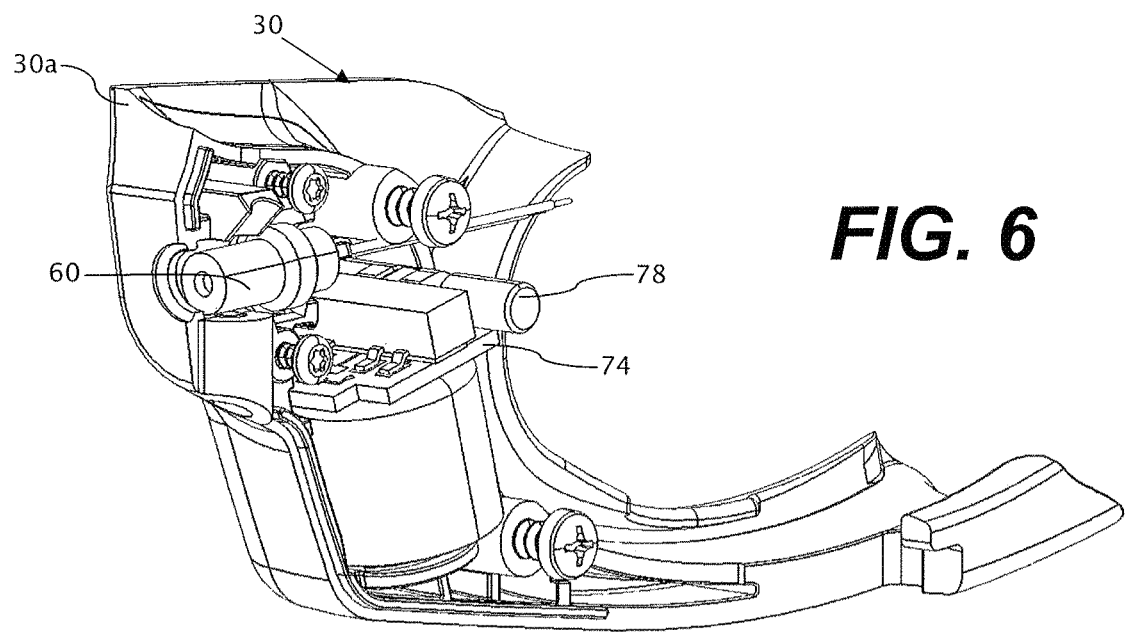
FIG. 6 is a perspective view of the alignment assembly of FIG. 2, having the laser cover and the coupling removed.

Referring to FIGS. 2, 3A and 3C, the remaining half 30b of the housing 30 is then connected to encapsulate the laser module 60, the coupling 90 and the laser cover 120.

In construction the alignment assembly 20, the coupling 90 is connected to the laser module 60 by virtue of the interference fit between the outer seat 64 of the laser module 60 and the internal seat 92 of the coupling 90. The connection of the coupling 90 and the laser module 60 is operably achieved without requiring or employing any adhesives.

The coupling 90 is then located within the socket 42 of the housing 30, and the laser cover 120 is engaged with the housing to dispose the coupling within the socket 122 of the laser cover 120. The laser module 60 is thus disposed in the predetermined non-aligned orientation with respect to a nominal aligned position.

The laser module 60 can then be readily brought to a nominal alignment position by moving the alignment pins 32, 34 in a known direction (as the non alignment position is known). Further, as the non-aligned position is known, the amount of movement of the respective alignment pin 32, 34 is generally known, and thus adjustment to the nominal alignment is readily accomplished. It is understood that there may be a de minimis amount of translation of the laser module 60 along the longitudinal or axial direction relative to the coupling 90, the housing 30 or the laser cover 120 during angular movement of the laser module. However, any such translation is merely a residual effect of the angular movement (rotation) of the laser module about at least one of longitudinal or axial directions. Thus, in one configuration, the laser module 60 pivots about a point that is within the dimension of the coupling 90 as the coupling extends along the longitudinal direction. In a further configuration, the laser module 60 pivots about a point that is within the volume defined by the coupling 90 (the volume including a volume of a through hole in the coupling for receiving the laser module.

The resiliency of the coupling 90 allows the laser module 60 to be moved angularly with respect to the housing 30 and laser cover 120, without requiring longitudinal or axial movement. Further, as the interference fits are without adhesives and the engagement of the laser cover and housing is set by the stop surfaces, the movement of the laser module 60 by the alignment pins 32, 34 is limited to angular movement and does not result in misaligning axial or longitudinal movement.

The housing 30 is then engaged with the firearm 10, and depending on the desired sighting in of the user, the laser module 60 can be further aligned by the alignment pins 32, 34.

The bias of the spring 140 and the coupling 90 along with the alignment pins 32, 34 act on the laser module 60 and tend to retain the laser module in a given position. Thus, once the alignment pins 32, 34 are threaded to the desired alignment of the laser module 60, the pins remain operably fixed relative to the housing 30 until acted upon by a driver, such as an Allen wrench or a screw driver.

Thus, the alignment pins 32, 34 can change the angular position the laser module 60 relative to the housing 30 and hence firearm 10 to provide the desired alignment position, such as the laser beam coinciding with a point of impact of a projectile fired from the firearm at a desired or predetermined distance.

Although the description has set forth the laser cover 120 as a separate component from the remaining housing half 30b, it is understood the structure and functionality of the laser cover can be incorporated into the housing 30, such as in the second housing half. Thus, the second housing half could engage the first housing half and form the recited interference fits and position the laser module 60 in the predetermined non-aligned position.

Figure 31:
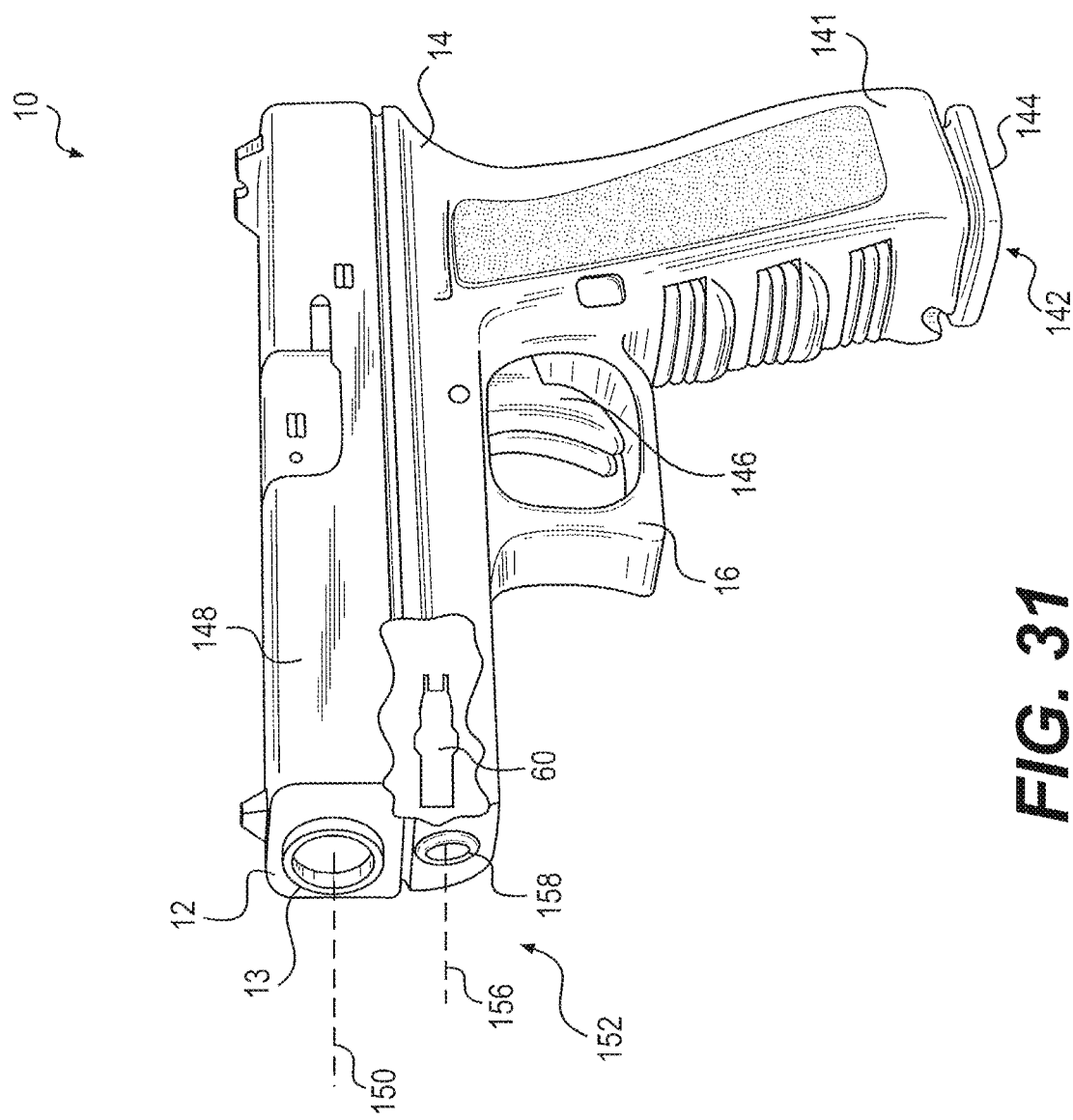
FIG. 31 illustrates a perspective view of an exemplary firearm with a target marker according to another embodiment of the present disclosure.

As shown in FIG. 31, the frame of firearm 10 may comprise a grip 141. The bottom of the grip 141 may include a magazine well 142, which may have a magazine 144 inserted into it. The magazine 144 may include a number of rounds of ammunition (not shown) and/or other like projectiles disposed therein. The firearm 10 may include a trigger 146 which, when depressed properly, may cause the firearm 10 to discharge a projectile from the magazine 144 via a firing process known in the art. The barrel 12 may be housed within a slide 148. When the projectile is discharged from the firearm 10, the projectile may exit the firearm 10 along a firing axis 150 via the muzzle end 152 of the barrel 12. The firing axis 150 may be substantially parallel to the barrel 12 of the firearm 10 and, further, may be longitudinal. In some embodiments, the barrel 12 may be selectively removable from the frame 14. Further, the barrel 12 may be held in place by the slide 148, such that when the slide 148 is removed, the barrel 12 may also be removed. The barrel 12 may be otherwise rigidly connected and removable from the frame 14. As will be described below with respect to FIGS. 31-34, in some embodiments, the laser module 60 may be disposed within a chamber 200 (FIG. 32) formed by the frame 10 beneath the barrel 12 of the firearm 10. The laser module 60 may be configured to emit a beam of radiation along a beam path 156, which may exit the frame 14 of the firearm 10 through an opening 158 in the muzzle end 152 of the frame 14. In the exemplary embodiment of FIGS. 31-34, the housing 30 and/or other components of the alignment assembly 20 described above may be omitted. Wherever possible, like item numbers have been used to identify like components of the embodiment shown in FIGS. 31-34.

In some embodiments, one or more optical components (not shown) may be disposed optically downstream of the laser module 60 along and/or within the beam path 156. The optical component may be configured to collimate radiation emitted by the laser module 60 and/or otherwise condition a beam emitted from the laser module 60 extending along the beam path 156. It is understood that the optical component may include any of a variety of lenses, such as the lens or window 70 described above, zoom components, magnification components, domes, diffraction gratings, filters, prisms, mirrors, and/or other like optical component s, mechanical components, or combinations thereof. Because the optical component is positioned along and/or within the beam path 156, and optically downstream of the laser module 60, one or more beams of radiation emitted by the laser module 60 may pass through, be shaped by, be conditioned by, and/or otherwise optically interact with the optical component before exiting the firearm 10.

Figure 32:
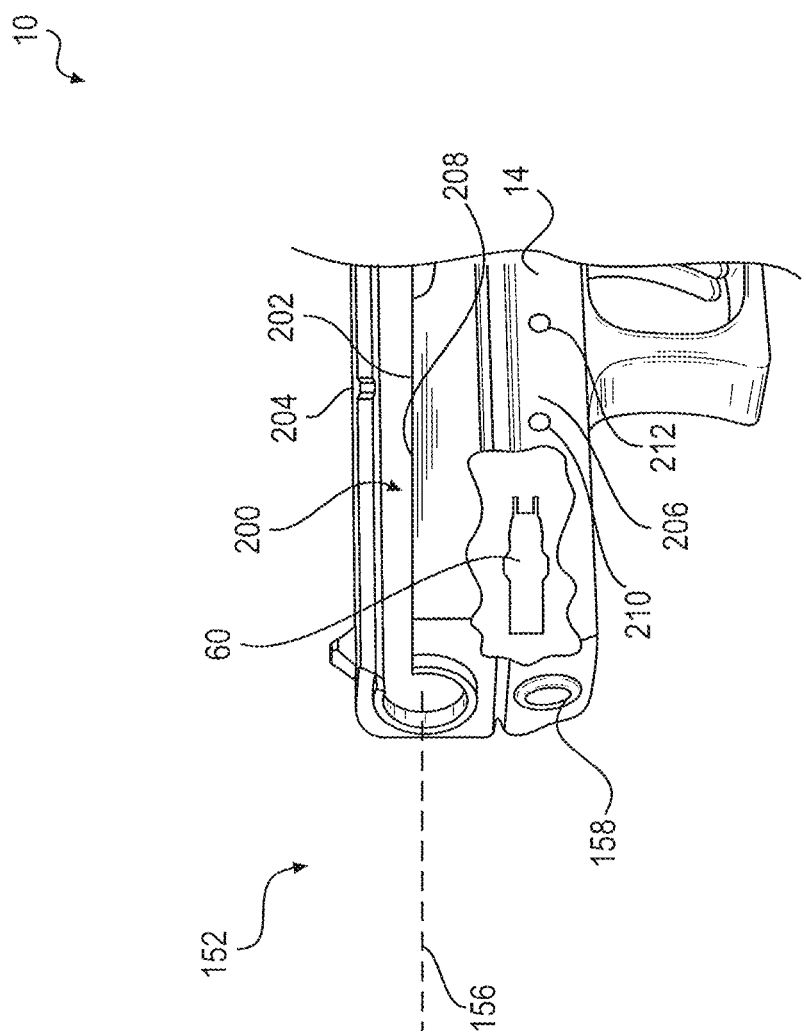
FIG. 32 is a perspective view of the firearm shown in FIG. 31.

As shown in FIG. 32, the chamber 200 may be formed by and/or included within a substantially hollow portion of the muzzle 13 (i.e., a "muzzle portion") beneath the barrel 12 (FIG. 31) of the firearm 10. The chamber 200 may be disposed between a first outer wall 202 of the frame 14, and a second outer wall 204 opposite the first outer wall 202. In exemplary embodiments, the laser module 60 may be disposed within the chamber 200.

In some embodiments, the first outer wall 202 may include a first surface 206, and a second surface 208 (FIG. 34) opposite the first surface 206. In some embodiments, a first passage 210 may be disposed within the first outer wall 202. For example, the passage 210 may include a first opening on the first surface 206, and a second opening opposite the first opening on the second surface 208 of the outer wall 202. In some embodiments, the passage 210 may extend substantially in the axial direction and, in further embodiments, the passage 210 may be a tapped hole. For example, the passage 210 may be substantially cylindrically-shaped and may be configured with a series of threads.

In further embodiments, a second passage 212 may be included within the first outer wall 202. For example, the first surface 206 may include a first opening of the passage 212, and the second surface 208 may include a second opening of the passage 212 opposite the first opening. The passage 212 may be substantially cylindrical, substantially square, and/or any other known shape. In some embodiments, the passage 212 may be configured to accept a switch and/or a switch arm (not shown). Such a switch and/or switch arm may be the substantially similar to the switch 76 and arm 78 described above. In exemplary embodiments, at least a portion of such a switch and/or switch arm may be disposed within the chamber 200 for selectively activating the laser module 60 by forming an electrical connection between the laser module 60 and the power supply 72. In exemplary embodiments, the switch, power supply 72, and/or laser module 60 may be operably connected to the control board 74 described above with respect to FIGS. 4-7 and 19. The switch 76 may comprise multiple positions such that the switch 76 may create a closed and/or open circuit either enabling or disabling the flow of power between the laser module 60 and the power supply 72. For example, when the switch 76 is in a closed position, the switch 76 may create a closed electrical circuit which may selectively power the laser module 60. In further embodiments, the switch 76 may also include an open position such that the switch 76 creates an open circuit which may prevent electricity from flowing to the laser module 60. In further embodiments, the switch 76 may comprise any tap-on/tap-off switch known in the art. In such embodiments, the switch 76 may be configured to direct a signal to a microprocessor or other like control component associated with the control board 74 directing the control component to activate or deactivate the laser module 60.

In exemplary embodiments, the switch 76 may be accessible by the user on both sides of the firearm 10. For example, the switch 76 may be accessible via both the first and second outer walls 202, 204. Alternatively, a first switch 76 may be disposed on a first side of the control board 74 and a second switch 76 may be disposed on a second side of the control board 74 opposite the first side thereof. In such embodiments, the first switch 76 may be accessible via the first outer wall 202 and the second switch 76 may be accessible via the second outer wall 204. Such switches 76 may be interrelated and may both be connected to the control component of the control board 74 for activation/deactivation of the laser module 60. It is understood that such switches 76 may also be used in the exemplary embodiments described above with respect to FIGS. 1-30. In still further embodiments, the switch 76 may not be disposed within the chamber 200. For example, the switch 76 may be disposed on and/or otherwise attached to the frame 14 of the firearm 10.

In additional embodiments, the second wall 204 may include an additional passage (not shown) opposite the passage 212. For example, the additional passage may have an opening disposed on a first side of the second wall 204, and a second opening opposite the first opening, on a second side of the second wall 204. The additional passage may be substantially opposite the passage 212 and may be configured to accept a portion of the switch 76 such that the switch 76 may be operable from either side of the firearm 10. Such passages may be included in both the first and second outer walls 202, 204 and, in exemplary embodiments, such passages may facilitate usage of a tap-on/tap-off switch 76.

Figure 33:
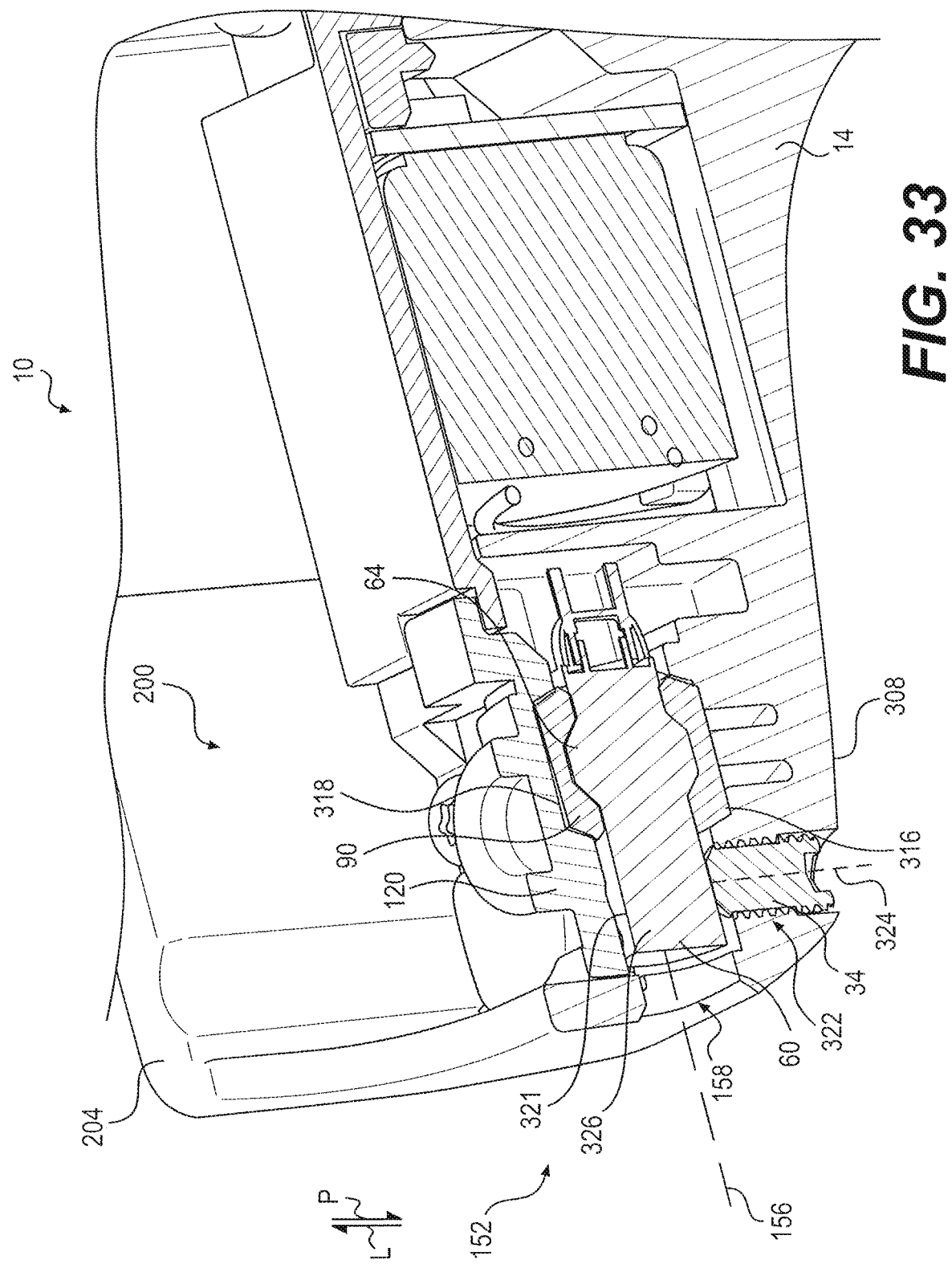
FIG. 33 is another cross sectional perspective view of the firearm shown in FIG. 31.

As shown in FIG. 33, in exemplary embodiments one or both of the resilient coupling 90 and the laser cover 120 may be disposed at least partially within the chamber 200 of the firearm 10. The resilient coupling 90 may facilitate angular movement of the laser module 60 within the chamber 200 and relative to, for example, the frame 14, without requiring longitudinal or axial movement. Such movement may be substantially similar to the movement of laser module 60 described above with respect to the exemplary embodiments of FIGS. 1-30.

Further, in the embodiments shown in FIGS. 31-34, the cover 120 and/or the frame 14 may be configured to accept the outer diameter geometry of the resilient coupling 90. For example, the frame 14 may include a first groove 316 which may have a shape complimentary to the outer surface of the resilient coupling 90. For example, the first groove 316 may be configured to cooperate and/or form an interference fit with the facets 104, 106 of the external seat 102. Further, the cover 120 may contain a corresponding second groove 318 which may also be configured to accept the outer surface of the resilient coupling 90. In some embodiments, the first and second grooves 316, 318 may be disposed substantially opposite each other when the cover 120 is assembled within the chamber 200. In some embodiments, the resilient coupling 90 and the grooves 316, 318 may form a connection, such as an adhesive-free interference fit, and/or other similar connection. In the exemplary embodiments of FIGS. 31-34, such engagement between the resilient coupling 90 and the grooves 316, 318 may allow for angular movement (rotation) of the laser module 60 about at least one of the longitudinal or axial directions described above.

In some embodiments, the laser module 60 may be disposed between at least one alignment pin 34, the cover 120, and the frame 14. In further embodiments, the laser module 60 may further be disposed between a pair of alignment pins 32, 34, the cover 120, and the frame 14. In the exemplary embodiment of FIGS. 31-34, the alignment pins 32, 34 may be disposed within respective passages 210, 322 formed in the frame 14 of the firearm 10. For example, the passages 210, 322 may each extend in an axial direction transverse to the axis of the barrel 12. In such embodiments, the passages 210, 322 may be spaced approximately 90 degrees from one another. Further, the passages 210, 332 may comprise tapped thru holes configured with a series of threads similar to the through holes 33, 35 described above with respect to the housing 30. In such embodiments, the alignment pins 32, 34 may comprise flat or Phillips-head screws, set screws, bolts, dowels, clips, clamps and/or any other known type of fasteners. In such embodiments, the alignment pins 32, 34 may be configured with a series of threads that may mate with a series of threads of the respective passages 210, 322, such that the alignment pins 32, 34 are threadingly engaged with the frame 14 via the passages 210, 322.

In such embodiments, the alignment pins 23, 34 may be movable in relation to the frame 14. For example, the alignment pin 34 may be configured to translate along an axis 324 extending in the axial direction. Rotation of the alignment pin 34 around the axis 324 may cause the alignment pin 34 to move in a direction L and/or a direction P (FIG. 34) relative to the frame 14. For example, rotation of the alignment pin 34 around the axis 324 in a clockwise direction may move the alignment pin 34 in the L direction and rotation in a counter-clockwise direction may move the alignment pin 34 in the P direction, or vice versa. Likewise, the alignment pin 32 may be configured to translate along an axis 402 extending in the axial direction substantially perpendicular to axis 324. Rotation of the alignment pin 32 around the axis 402 may cause the alignment pin 32 to move in a direction M and/or a direction N (FIG. 34) relative to the frame 14. For example, rotation of the alignment pin 32 around the axis 402 in a clockwise direction may move the alignment pin 32 in the N direction and rotation in a counter-clockwise direction may move the alignment pin 32 in the M direction, or vice versa.

It is understood that the alignment pins 32, 34 may be configured to contact an outer surface 321 of the laser module 60 at respective locations forward or rearward of the outer seat 64. For example, a first end of the alignment pin 34 may be disposed within the passage 322, and a second end of the alignment pin 34 may contact the outer surface 321 of the laser module 60. In some embodiments, the outer surface 321 of the laser module 60 may contain one or more features (not shown) configured to accept the respective alignment pins 32, 34. For example, the outer surface 321 of the laser module 60 may contain one or more groove s, notches, or indents configured to assist with alignment of the laser module 60. In such embodiments, the respective second ends of the alignment pins 32, 34 may mate with the respective indents while aligning the laser module 60. It is understood, however, that when the cover 120 has been properly installed within the chamber 200 such that the laser module 60 is disposed within the chamber 200 between the cover 120 and the frame 14, and the cover 120 may form an interference fit with the resilient coupling 90 to hold the laser module 60 stationary within the chamber. In such a configuration, the alignment pins 32, 34 may contact the outer surface 321 while the cover 120 is spaced from the outer surface 321 by the resilient coupling 90. Such spacing may allow for alignment of the laser module 60 relative to the frame 14 and the cover 120 by the alignment pins 32, 34.

In additional exemplary embodiments, the laser module 60 may be further disposed between a biasing device 404 and the alignment pins 32, 34. The biasing device 404 may comprise any compressible component known in the art such as a spring, a flexible compressible rod, and/or other known biasing device. In some embodiments, the biasing device 404 may be disposed within a pocket 406 formed by the cover 120 and/or the frame 14 of the firearm 10. For example, the frame 14 of the firearm 10 may form a bottom portion of the pocket 406 and the cover 120 may form a top portion of the pocket 406. In exemplary embodiments, the pocket 406 may be substantially cylindrically-shaped. For example, the frame 14 may contain a semi-cylindrical cutout which may have a substantially similar diameter to a complimentary semi-cylindrical cutout in the cover 120. When the cover 120 is fixed to the frame 14, the two semi-cylindrical cutouts may form the pocket 406 which may have a resulting substantially cylindrical shape. In other embodiments, the pocket 406 may be any other shape, for example, the pocket 406 may be substantially square, substantially rectangular, and/or any other shape configured to accept the biasing device 404.

In some embodiments, the biasing device 404 may be disposed between an end surface 410 of the pocket 406 and the laser module 60. For example, in some embodiments, when compressed the biasing device 404 may exert a force, such as a biasing force, on the laser module 60 and the end surface 410. For example, a first end of the biasing device 404 may contact the laser module 60, and a second end opposite the first end, may contact the end surface 410 of the pocket 406. The biasing force may be in direction S and/or direction R, which may be between approximately 130 degrees and approximately 150 degrees from the axis 402 and/or the axis 324. It is understood that in further exemplary embodiments, the biasing force may be directed at other orientations relative to one or more of the axes 402, 324.

In additional exemplary embodiments not illustrated, the laser module 60 may be further dis posed between a second biasing device (not shown). For example, the first biasing device 404 may be substantially opposite the alignment pin 34 such that a center axis of the pocket 406 may be parallel to and align with the axis 324 of the alignment pin 34. In such embodiments, the first biasing device 404 may be disposed within a pocket formed by the cover 120 and/or the frame 14. In such a configuration, the first biasing device 404 may exert a biasing force on the laser module 60 in the L and/or P direction. The second biasing device, on the other hand, may be located substantially opposite the second alignment pin 32 and may be disposed within a second pocket (not shown). For example, similar to the pocket 406, the second pocket may be formed by the cover 120 and/or the frame 14. For example, the frame 10 may contain a first semi-cylindrical cutout and the cover 120 may contain a second semi-cylindrical cutout with a diameter substantially similar to the first cutout such that when the cover 120 is fixed to the frame 14, the two cutouts form a substantially cylindrical pocket. The second pocket may have a center axis which may align with the axis 402 of the second alignment pin 32. In such embodiments, the second biasing device may exert a biasing force on the laser module 60 in the M and/or N direction. It is understood that the one or more biasing devices described herein may assist in biasing the laser module 60 in a predetermined orientation that is not an intended operating orientation. For example, the one or more biasing devices, chamber 200, and cover 120 may be configured such that upon engagement of the cover 120 and the frame 14 to retain the laser module 60 within the chamber 200, the laser module 60 may be disposed in a predetermined nonaligned orientation. In the embodiment shown in FIGS. 31-34, the one or more biasing devices may bias the laser module 60 toward each alignment pin 32, 34 by between approximately 1 degree and approximately 5 degrees relative to the beam path 156. It is also understood that in the various exemplary embodiments described herein, the communication between, for example, the cover 120 and the resilient coupling 90 may also bias the laser module 60 in the direction of one or both of the alignment pins 32, 34.

In some embodiments, the trajectory of the beam path 156 may intersect with the trajectory of the firing axis 150 at a point of impact disposed a predetermined distance from the firearm 10. For example, the beam path 156 may comprise an optical axis highlighting a point of impact on a target located a set distance from the firearm 10. In some embodiments, accurately aligning the beam path 156 and the firing axis 150 may require relative movement of the laser module 60 to the firearm 10.

Figure 34:
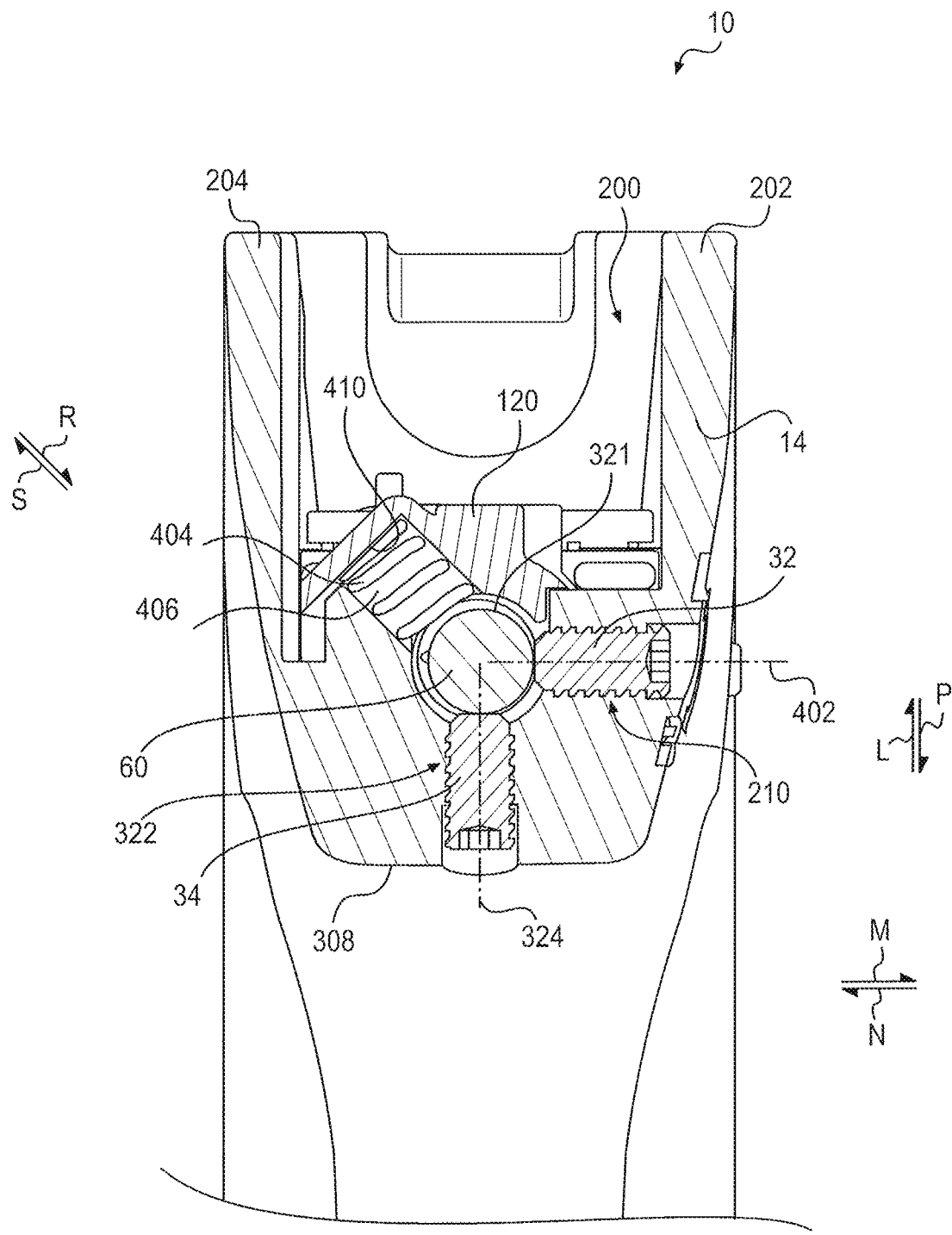
FIG. 34 is a cross sectional view of the firearm shown in FIG. 31.

For example, in some embodiments, as shown in FIG. 34, the laser module 60 may be movable in the L and/or P direction. For example, the alignment pin 34 may be configured to move the laser module 60 in relation to the frame 14 of the firearm 10. For example, rotation of the alignment pin 34 around the axis 324 may pivot, rotate, and/or otherwise move the laser module 60 in relation to the frame 14. Rotation of the alignment pin 34 may cause the laser module 60 to pivot, rotate, and/or otherwise move in a direction substantially transverse to the firing axis 150 (FIG. 31) in the L and/or P direction.

In still further embodiments, the biasing device 404 may be configured to exert a biasing force in the R direction against the outer surface 321 of the laser module 60 and may further facilitate movement of the laser module 60. For example, movement of the alignment pin 34 in the P direction may cause the biasing device 404 to expand and pivot, rotate, and/or otherwise move the laser module 60 substantially in the P and/or R direction. Further, movement of the alignment pin 34 in the L direction may compress the biasing device 404 and may pivot, rotate, and/or otherwise move the laser module 60 in the substantially in the L and/or S direction. Movement of the laser module 60 in the L, P, S, R, M, N, and/or any other direction facilitated by movement of one or both of the alignment pins 32, 34 and biasing device 404 may assist in aligning the beam path 156 with the firing axis 150 of the firearm 10.

In still further embodiments, as shown in FIG. 34, the laser module 60 may be further pivotable, rotatable, and/or otherwise moveable in the M and/or N direction substantially transverse to the firing axis 150. For example, rotation of the alignment pin 32 about the axis 402 may move the alignment pin 32 in the M and/or N direction, which may, through contact with the laser module 60, also pivot, rotate, and/or otherwise move the laser module 60 in the M and/or N direction. For example, in some embodiments, movement of the alignment pin 32 in the M direction may cause the biasing device 404 to exert a positive bias on the laser module 60 in the R direction such that movement of the alignment pin 32 in the M direction may enable the biasing device 404 to pivot, rotate, and/or otherwise move the laser module 60 substantially in the R and/or M direction. Conversely, movement of the alignment pin 32 in the N direction may pivot, rotate, and/or otherwise move the laser module 60 in the same direction and may cause the biasing device 404 to compress. In some embodiments, such angular movement of the laser module 60 may cause the beam path 156 to align with the firing axis 150 at a predetermined distance from the firearm 10.

The present system has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A firearm, comprising:
   a frame;
   a laser module coupled to the frame and configured to emit a beam along a beam axis, the laser module having:
     an emitting surface with a first radial width at a first end of the laser module, and
     an annular ridge adjacent a second end of the laser module with a second radial width greater than the first radial width and comprising non-parallel contact faces;
   a resilient member at least partially surrounding the laser module at the annular ridge, the resilient member comprising facets receiving the non-parallel contact faces of the annular ridge;
   a first alignment pin disposed adjacent the laser module along a first direction;
   a second alignment pin disposed adjacent the laser module along a second direction perpendicular to the first direction; and
   a biasing component disposed adjacent the laser module and configured to apply a force against the laser module along a third direction, the third direction different from the first direction and the second direction.

2. The firearm of claim 1, wherein the resilient member resists axial and longitudinal movement of the laser module relative to the frame.

3. The firearm of claim 1, wherein the resilient member resists longitudinal deviation based at least in part by an extent of deviation of an interface between the resilient member and the laser module.

4. The firearm of claim 1, wherein:
the frame has a first outer wall and a second outer wall opposite the first outer wall, the first outer wall defining a first groove and the second outer wall defining a second groove such that the first groove interfaces with the second groove to form a receiving socket;
the first groove is disposed opposite the second groove;
the resilient member is positioned between the first groove and the second groove; and
the resilient member forms an interference fit with the first groove and the second groove.

5. The firearm of claim 1, wherein:
the first alignment pin comprises a first threaded component to engage with first threads defined by the frame to move the laser module relative to the frame in the first direction; and
the second alignment pin comprises a second threaded component to engage with second threads defined by the frame to move the laser module relative to the frame in the second direction.

6. The firearm of claim 1, wherein the first direction and second direction define a plane, and wherein the third direction lies along the plane.

7. The firearm of claim 1, wherein an angle between the first direction and the third direction is approximately one hundred and thirty-five degrees.

8. The firearm of claim 1, wherein the resilient member comprises an elastomeric material.

9. The firearm of claim 8, wherein the resilient member has a durometer measurement of at least 69.

10. A device, comprising:
a housing defining a first socket part and a second socket part;
a laser module configured to emit a beam along a beam axis and through an emitting surface disposed at a first end of the laser module, wherein the emitting surface has a first radial width and the laser module further comprises an annular ridge disposed adjacent a second end of the laser module having a second radial width greater than the first radial width, the annular ridge comprising non-parallel contact faces;
a resilient member comprising an internal seat comprising facets receiving the non-parallel contact faces of the annular ridge, the resilient member being configured to enable angular movement of the laser module relative to the housing; and
an alignment device engaged with the laser module, wherein the alignment device engages with the laser module at a location that is closer to the emitting surface of the laser module than the annular ridge.

11. The device of claim 10, wherein the resilient member resists longitudinal deviation between the laser module and the housing.

12. The device of claim 10, wherein the alignment device comprises a first alignment pin and a second alignment pin, the first alignment pin perpendicular to the second alignment pin.

13. The device of claim 12, wherein the alignment device further comprises a biasing device that resists movement of the laser module in response to movement of both the first alignment pin and the second alignment pin.

14. The device of claim 12, wherein:
the first alignment pin is movably joined to the housing and configured to pivot the laser module relative to the housing about the annular ridge; and
the second alignment pin is movably joined to the housing and configured to pivot the laser module relative to the housing about annular ridge.

15. The device of claim 10, wherein the resilient member has a durometer measurement of at least 69.

16. A device, comprising:
a housing coupleable to a firearm, the housing including:
a socket, and
an opening;
a laser module oriented to emit light through the opening, the laser module having:
an emission surface with a first radial width at a first end of the laser module; and
an annular ridge disposed adjacent a second end of the laser module and defined in part by non-parallel contact faces and having a second radial width greater than the first radial width;
a resilient member disposed within the socket and comprising a recess receiving the annular ridge, the recess comprising internal facets receiving the non-parallel contact faces of the annular ridge; and
an alignment device engaged with the laser module.

17. The device of claim 16, further comprising:
an arm extending through the housing; and
a switch operably coupled to the laser module, the switch being actuatable via movement of the arm.

18. The device of claim 16, wherein the alignment device comprises a first alignment pin and a second alignment pin, the first alignment pin perpendicular to the second alignment pin.

19. The device of claim 18, wherein the alignment device further comprises a biasing device that resists movement of the laser module in response to movement of both the first alignment pin and the second alignment pin.

20. The device of claim 16, wherein:
the resilient member resists longitudinal deviation of the laser module away from the socket along a longitudinal direction; and
the resilient member resists the longitudinal deviation by an extent determined at least in part by an extent of deviation of an axial dimension between the resilient member, the laser module, and the socket.

* * * * *